US012729944B2

(12) United States Patent
Takatsu et al.

(10) Patent No.: US 12,729,944 B2
(45) Date of Patent: Sep. 8, 2026

(54) AUTOMATIC INSIDE-DIAMETER MEASURING APPARATUS

(71) Applicant: MITUTOYO CORPORATION, Kanagawa (JP)

(72) Inventors: Yuhei Takatsu, Saitama (JP); Masashi Yamaji, Hiroshima (JP); Yuya Arashi, Kanagawa (JP); Chihiro Yamamoto, Kanagawa (JP); Shuji Hayashida, Kanagawa (JP)

(73) Assignee: MITUTOYO CORPORATION, Kanagawa (JP)

( * ) Notice: Subject to any disclaimer, the term of this patent is extended or adjusted under 35 U.S.C. 154(b) by 485 days.

(21) Appl. No.: 18/385,501

(22) Filed: Oct. 31, 2023

(65) Prior Publication Data

US 2024/0151506 A1 May 9, 2024

(30) Foreign Application Priority Data

Nov. 3, 2022 (JP) ................................. 2022-176819

(51) Int. Cl.
*G01B 5/12* (2006.01)
*B25J 9/16* (2006.01)

(52) U.S. Cl.
CPC .............. *G01B 5/12* (2013.01); *B25J 9/1694* (2013.01)

(58) Field of Classification Search
CPC . G01B 5/12; G01B 21/14; G01B 21/10; B25J 9/1694; B25J 9/1679; B25B 11/00
See application file for complete search history.

(56) References Cited

U.S. PATENT DOCUMENTS

| | | | | |
|---|---|---|---|---|
| 12,385,732 B2 * | 8/2025 | Yamaji | ..................... | G01B 5/12 |
| 12,392,595 B2 * | 8/2025 | Yamaji | ..................... | G01B 5/10 |
| 12,590,794 B2 * | 3/2026 | Ogawa | ..................... | G01B 5/12 |
| 2010/0005676 A1 | 1/2010 | Fujikawa et al. | | |
| 2024/0151506 A1 * | 5/2024 | Takatsu | .................. | B25J 9/1679 |
| 2024/0345116 A1 * | 10/2024 | Sasaki | ..................... | G01B 5/12 |

FOREIGN PATENT DOCUMENTS

| | | |
|---|---|---|
| JP | H08-014871 | 1/1996 |
| JP | 2010-19783 | 1/2010 |

* cited by examiner

*Primary Examiner* — Yaritza Guadalupe-McCall
(74) *Attorney, Agent, or Firm* — Greenblum & Bernstein, P.L.C.

(57) ABSTRACT

An automatic measuring apparatus includes an inside-diameter measuring unit that measures the inside diameter of a workpiece, a robot arm part, and a control unit. The inside-diameter measuring unit is installed with the tip side facing upward. A cone-shaped guide cone is provided at the tip of the inside-diameter measuring unit. A workpiece stopper is attached to the outside of the inside-diameter measuring unit. A support surface, which serves as a placing surface on which the workpiece is placed, is supported by a spring, and the inclination and position of the support surface changes to follow a change in the posture and position of the workpiece.

12 Claims, 13 Drawing Sheets

AUTOMATIC INSIDE-DIAMETER MEASURING APPARATUS

INCORPORATION BY REFERENCE

This application is based upon and claims the benefit of priority from JP patent application No. 2022-176819, filed on Nov. 3, 2022 (DAS code 5D7B), the disclosure of which is incorporated herein in its entirety by reference.

BACKGROUND OF THE PRESENT INVENTION

1. Field of the Present Invention

The present invention relates to an automatic inside-diameter measuring apparatus.

2. Description of Related Art

Measuring devices for measuring the inside diameter of a hole are inside-diameter measuring devices, such as hole tests, cylinder gauges, and Borematic (registered trademark) (see, for example, JP 2010-19783 A). However, when using such an inside-diameter measuring device, manual measurement is inevitably required, because its contact point must be moved forward and backward or centering is performed to some extent while the inside-diameter measuring device is inserted in a hole. Therefore, it takes a lot of manpower and time to check the machining accuracy of a hole with such an inside-diameter measuring device.

As an alternative to manual measurement, an air micrometer is an inside-diameter measuring apparatus that automates inside-diameter measurement at production sites (see, for example, JP H8-14871 A). The air micrometer, which is simply inserted into a hole and blows air out, is a suitable measuring apparatus for automating inside-diameter measurement among the current options.

Patent Literature 1: JP 2010-19783

Patent Literature 2: JP H08-014871

SUMMARY OF THE PRESENT INVENTION

However, air micrometers also have the following disadvantages. First, air micrometers are very expensive because of their structure. In addition, an air compressor needs to be prepared and maintained. In terms of measurement capability, the repeatability of air micrometers is limited due to their structure, and their measurement range is extremely short (a few hundred micrometers).

A common problem with manual measurement using manual measuring devices has been the demand to automate measurement as inexpensively as possible.

There is a need for a measuring unit that is inexpensive, easy to use, and can automate measurement. For example, there is a need for an inside-diameter measuring unit that is inexpensive, easy to use, and can automate hole-diameter measurement.

An automatic inside-diameter measuring apparatus according to an exemplary embodiment of the present invention includes:

- an inside-diameter measuring part;
- a moving means for relatively moving a workpiece having a hole to be measured with respect to the inside-diameter measuring part to insert and retract the inside-diameter measuring part into and from the hole to be measured; and

- a control unit configured to control operation of the inside-diameter measuring part and the moving means, wherein
- the inside-diameter measuring part includes:
  - a contact point configured to move forward and backward in a direction intersecting a cylinder axis of a cylinder case part at a tip side of the cylinder case part;
  - an electric drive unit configured to move the contact point forward and backward; and
  - a displacement detection part configured to detect displacement of the contact point.

In an exemplary embodiment of the present invention, it is preferable that the inside-diameter measuring part is installed with the tip side facing upward.

In an exemplary embodiment of the present invention, it is preferable that a workpiece stopper having a support surface supporting the workpiece is provided outside the cylinder case part and closer to a base end side from a position at which the contact point is provided.

In an exemplary embodiment of the present invention, it is preferable that the support surface of the workpiece stopper is an elastic member or is supported by an elastic member.

In an exemplary embodiment of the present invention, it is preferable that the workpiece stopper is configured to follow a change in posture or position of the workpiece to allow an inclination or a position of the support surface to change.

In an exemplary embodiment of the present invention, it is preferable that the workpiece stopper includes:

- a cylinder housing part fixed to an outside of the inside-diameter measuring part; and
- a spring provided inside the housing part to surround the outside of the inside-diameter measuring part, and
- the support surface is supported by the spring.

In an exemplary embodiment of the present invention, it is preferable that a guide member having a diameter smaller than a diameter of a tip end face of the cylinder case part is provided on the tip end face of the cylinder case part.

In an exemplary embodiment of the present invention, it is preferable that the guide member is conical.

An automatic measuring apparatus according to an exemplary embodiment of the present invention includes:

- the automatic inside-diameter measuring apparatus according to any one of claims 1 to 8; and
- an outside-diameter measuring part configured to measure an outside dimension of the workpiece, wherein
- the outside-diameter measuring part includes:
  - a movable element provided to be displaceable with respect to a fixed element and configured to move forward and backward to be brought into contact with or away from an outer surface of the workpiece;
  - a displacement detection part configured to detect displacement of the movable element; and
  - an automatic operation unit configured to automate the forward and backward movement of the movable element by power.

An inside-diameter measuring apparatus according to an exemplary embodiment of the present invention includes:

- an inside-diameter measuring part including a contact point configured to move forward and backward in a direction intersecting a cylinder axis of a cylinder case part at a tip side of the cylinder case part, and a displacement detection part configured to detect displacement of the contact point; and a workpiece stopper provided outside the cylinder case part and closer to a base end side from a position at which the contact point is provided, wherein the workpiece stopper has a support surface supporting a workpiece outside the cylinder case part, the support surface of the workpiece stopper is an elastic member or is supported by an elastic member, and the workpiece stopper is configured to follow a change in posture or position of the workpiece to allow an inclination or a position of the support surface to change.

In an exemplary embodiment of the present invention, it is preferable that a guide member having a diameter smaller than a diameter of a tip end face of the cylinder case part is provided on the tip end face of the cylinder case part.

A control method for an automatic inside-diameter measuring apparatus according to an exemplary embodiment of the present invention, the automatic inside-diameter measuring apparatus including:

an inside-diameter measuring part including a contact point configured to move forward and backward in a direction intersecting a cylinder axis of a cylinder case part at a tip side of the cylinder case part, an electric drive unit configured to move the contact point forward and backward, and a displacement detection part configured to detect displacement of the contact point;

a moving means for relatively moving a workpiece having a hole to be measured with respect to the inside-diameter measuring part to insert and retract the inside-diameter measuring part into and from the hole to be measured; and a control unit configured to control operation of the inside-diameter measuring part and the moving means, the control method includes:

drive-controlling, by the control unit, the moving means to release the workpiece above the cylinder case part in such a manner that a guide member, the guide member having a diameter smaller than a diameter of a tip end face of the cylinder case part and being provided on the tip end face of the cylinder case part, is inserted into the hole in the workpiece; and causing, by the control unit, the inside-diameter measuring part to measure the workpiece supported by a workpiece stopper, the workpiece stopper having a support surface supporting the workpiece and being provided outside the cylinder case part and closer to a base end side from a position at which the contact point is provided, wherein the inside-diameter measuring part is installed with the tip side facing upward.

A control method for an automatic measuring apparatus according to an exemplary embodiment of the present invention, the automatic measuring apparatus including:

an inside-diameter measuring part including a contact point configured to move forward and backward in a direction intersecting a cylinder axis of a cylinder case part at a tip side of the cylinder case part, an electric drive unit configured to move the contact point forward and backward, and a first displacement detection part configured to detect displacement of the contact point;

an outside-diameter measuring part including a movable element provided to be displaceable with respect to a fixed element and configured to move forward and backward to be brought into contact with or away from an outer surface of a workpiece, a second displacement detection part configured to detect displacement of the movable element, and an automatic operation unit configured to automate the forward and backward movement of the movable element by power;

a moving means for relatively moving the workpiece with respect to the inside-diameter measuring part and the outside-diameter measuring part; and a control unit configured to control operation of the inside-diameter measuring part, the outside-diameter measuring part, and the moving means, the control method includes:

measuring, by the inside-diameter measuring part, an inside diameter of the workpiece supported by a workpiece stopper, the workpiece stopper having a support surface supporting the workpiece and being provided outside the cylinder case part and closer to a base end side from a position at which the contact point is provided; and measuring, by the outside-diameter measuring part, an outside diameter of the workpiece supported by the workpiece stopper, wherein the workpiece stopper also serves as a workpiece holding base part holding the workpiece within a measurement area for the outside-diameter measuring part.

DETAILED DESCRIPTION

Figure 1:
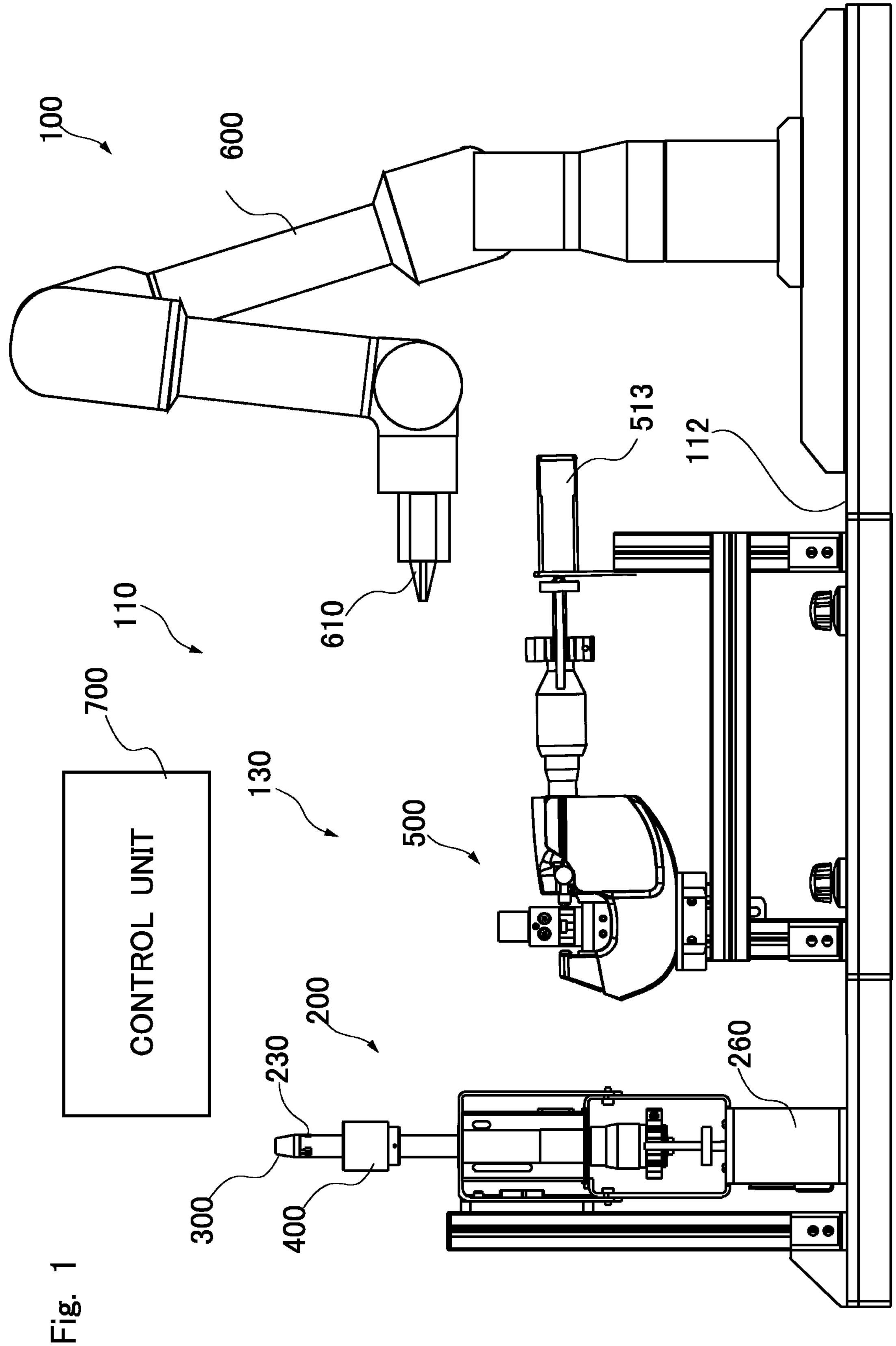
FIG. 1 is an external view of an automatic measuring apparatus.

Exemplary embodiments of the present invention are illustrated and described with reference to the reference signs assigned to the elements in the drawings.

First Exemplary Embodiment

In the following, a first exemplary embodiment of the present invention is described.

FIG. 1 is an external view of an automatic measuring apparatus 100.

The present exemplary embodiment describes the automatic measuring apparatus 100 that automates the measurement of the inside diameter (or inside dimension) and the outside diameter (or outside dimension) of a workpiece (object to be measured).

The automatic measuring apparatus 100 includes a measuring-apparatus main body 110 and a control unit 700 that controls the overall operation.

(Measuring-Apparatus Main Body)

The measuring-apparatus main body 110 includes a measuring unit 130, which is a measuring device that actually measures the workpiece, and a multi-joint robot arm part (moving means) 600 as a moving means for relatively moving the workpiece with respect to the measuring unit 130.

The measuring-apparatus main body 110 includes a mounting stand 112, and the measuring unit 130 and the robot arm part 600 are disposed on the mounting stand 112.

The measuring unit 130 includes an inside-diameter measuring unit (inside-diameter measuring part) 200 that measures the hole diameter of the workpiece and an outside-diameter measuring unit (outside-diameter measuring part) 500 that measures the outside diameter of the workpiece.

(Inside-Diameter Measuring Unit 200)

The inside-diameter measuring unit 200 is described below.

The basic configuration of the inside-diameter measuring unit 200 is an automated version of the rod feed of an existing manual inside-diameter measuring device (for example, a hole test). However, in the present exemplary embodiment, moving (transferring) the workpiece is to be automated by the robot arm part 600. Therefore, the automatic measuring apparatus 100 is devised to easily and securely insert a contact point 230 of the inside-diameter measuring unit 200 into a hole to be measured of the workpiece, even when the workpiece is transferred by the robot arm part 600 instead of by human hands. In addition, in order to accurately measure the inside diameter of the workpiece with the inside-diameter measuring unit 200, it is important to align the axes (postures) of the inside-diameter measuring unit 200 and the workpiece. Therefore, in order to accurately measure the hole to be measured, the inside-diameter measuring unit 200 has a function (configuration) to adjust the relative posture of the workpiece without human intervention.

Figure 2:
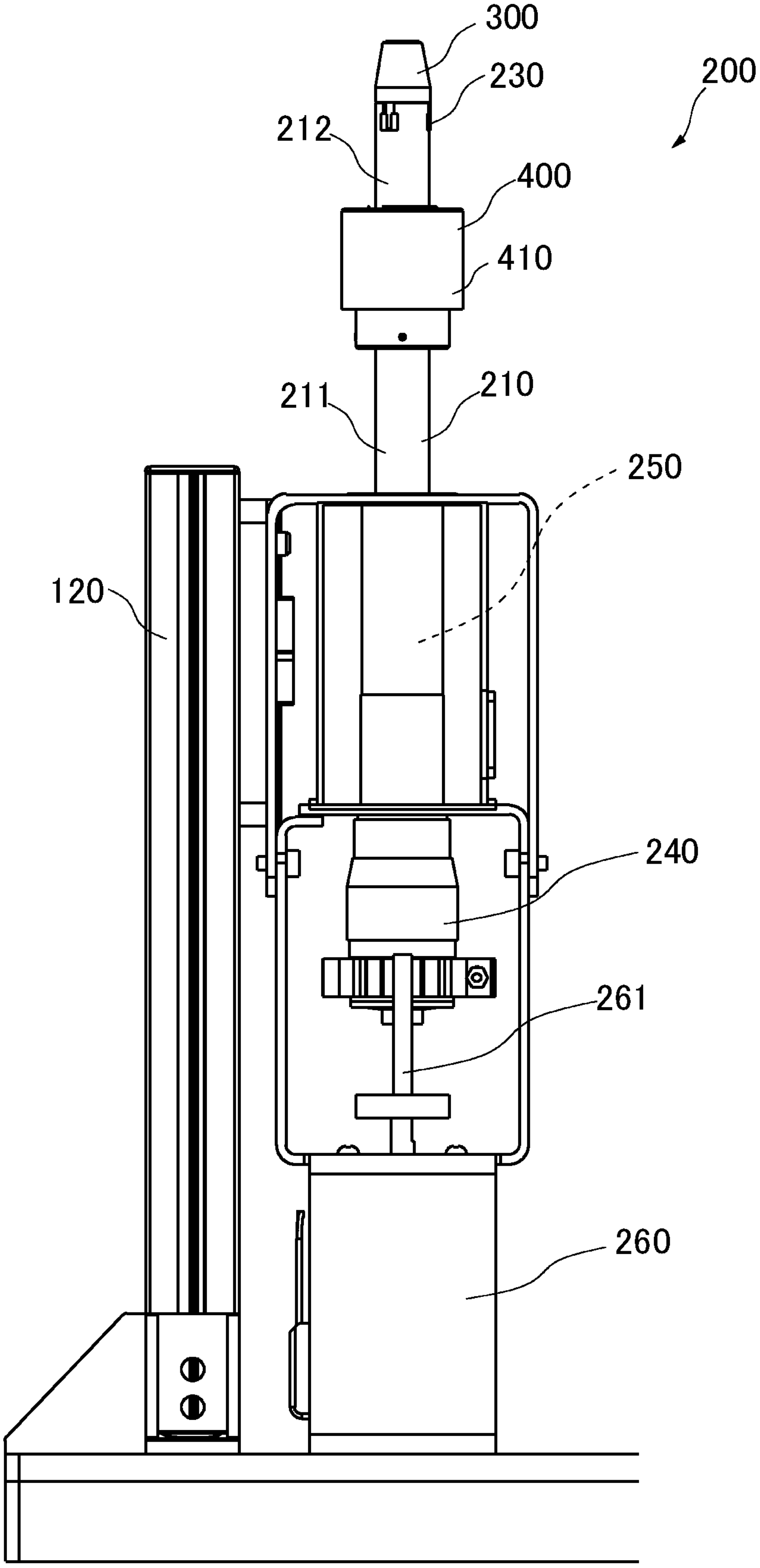
FIG. 2 is an external view of an inside-diameter measuring unit.

FIG. 2 is an external view of the inside-diameter measuring unit 200.

Figure 3:
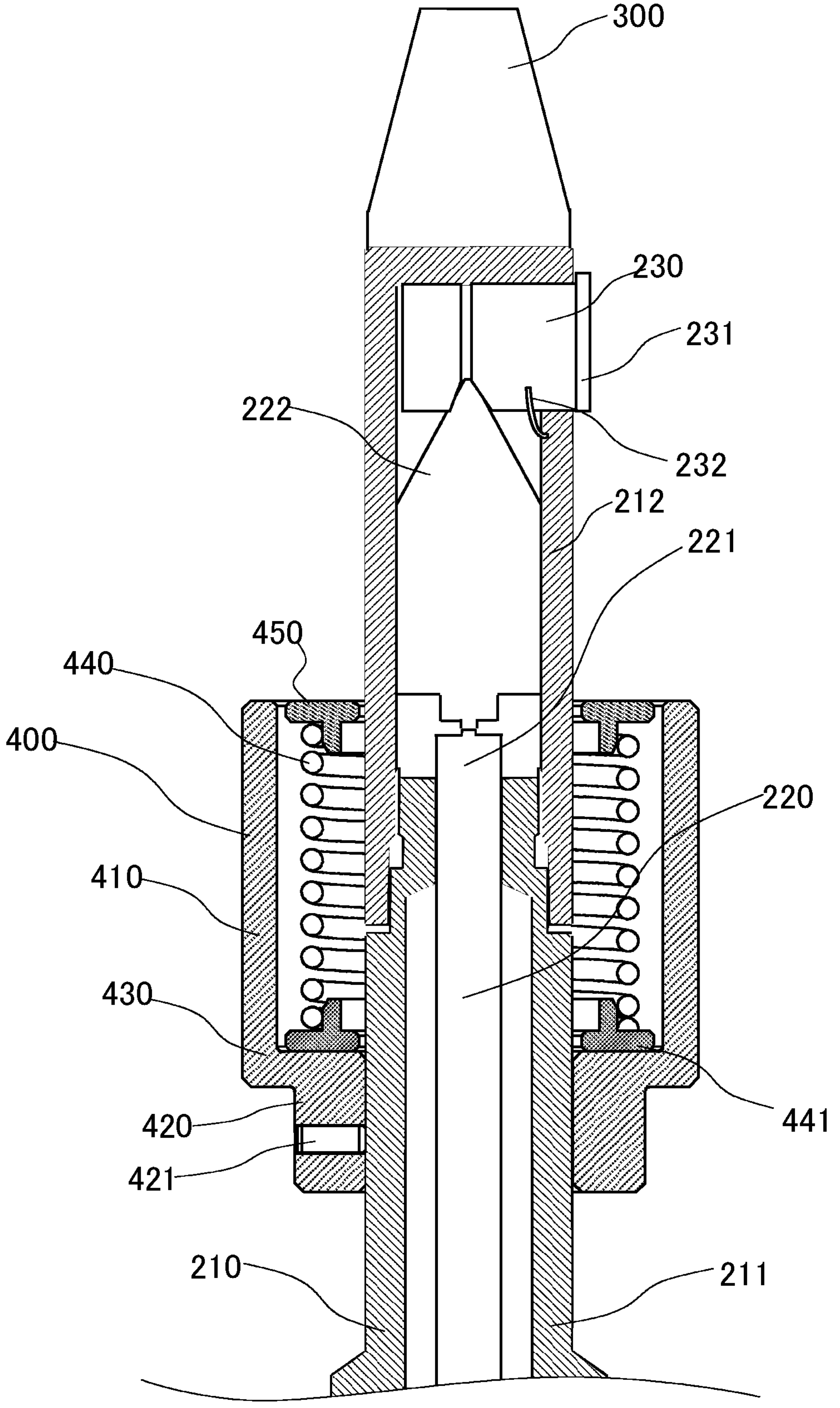
FIG. 3 is a cross-sectional view for explaining an internal structure of the tip side of the inside-diameter measuring unit.
Figure 4:
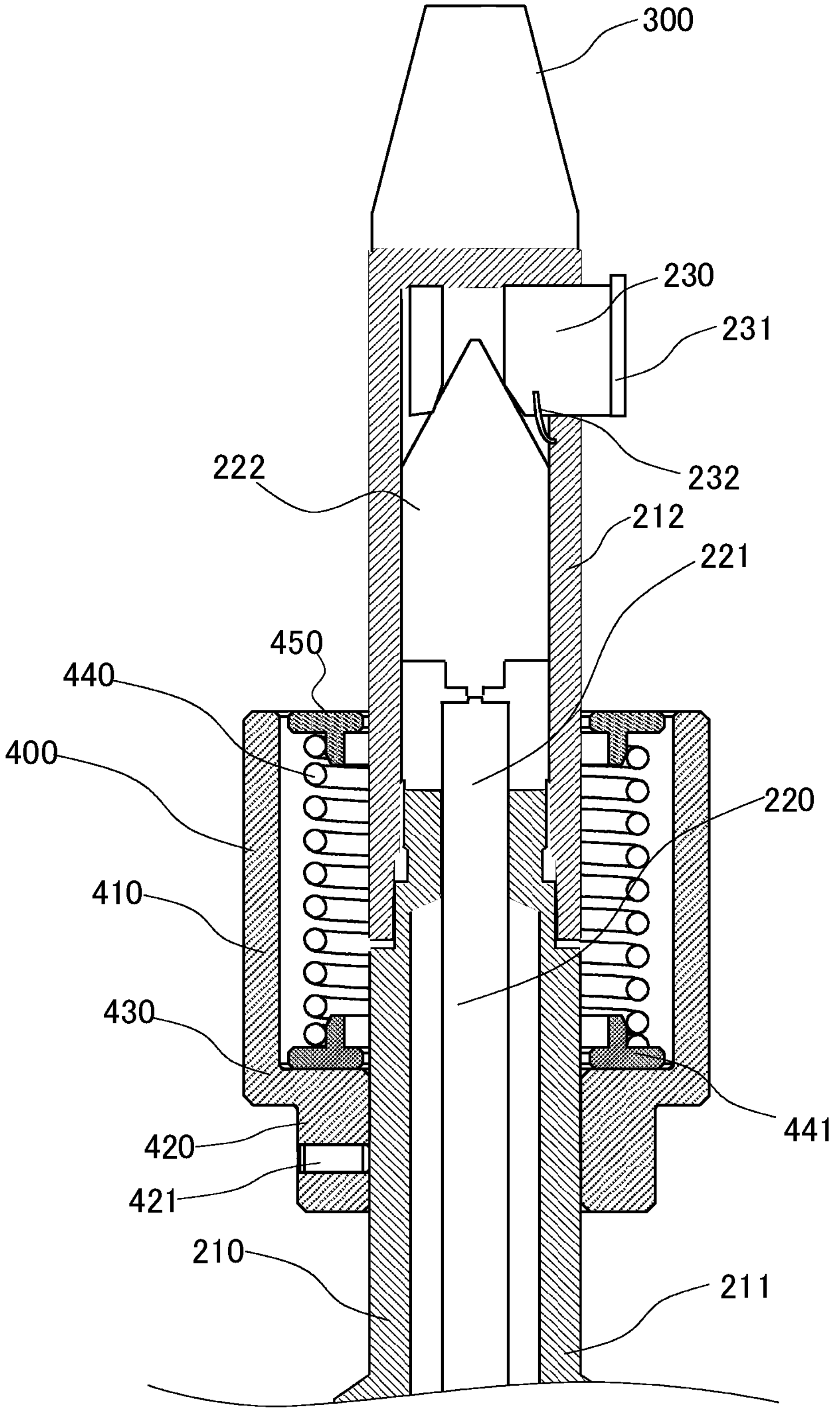
FIG. 4 is a cross-sectional view for explaining the internal structure of the tip side of the inside-diameter measuring unit.

FIGS. 3 and 4 are cross-sectional views for explaining the internal structure of the tip side of the inside-diameter measuring unit 200.

The inside-diameter measuring unit 200 includes a cylinder case part 210, a rod 220, a contact point 230, a thimble part 240, a displacement detection part 250, an electric drive unit 260, a guide cone (guide member) 300, and a workpiece stopper 400.

The cylinder case part 210 is a cylindrical case as a whole. The rod 220 moves axially forward and backward inside the cylinder case part 210. The cylinder case part 210 includes a body cylinder part 211 and a head cylinder part 212.

The body cylinder part 211 accommodates almost the entire rod 220. The body cylinder part 211 has a female thread (not shown) on part of the inner circumference thereof. This female thread is screwed with a feed screw of the rod 220 and constitutes a feed mechanism that feeds the rod 220 in the axial direction as the rod 220 rotates. The body cylinder part 211 further accommodates the displacement detection part 250 that detects the forward/backward movement (displacement or position) of the rod 220.

The head cylinder part 212 is connected to the tip side of the body cylinder part 211, and the head cylinder part 212 constitutes a measuring head part. In the present exemplary embodiment, the tip side is one end of the cylinder case part 210 provided with the head cylinder part 212. In the present exemplary embodiment, the inside-diameter measuring unit 200 is installed with the head cylinder part 212, that is, the measuring head part, facing upward. Here, the inside-diameter measuring unit 200 is supported in a vertical posture by a support column 120 provided in a standing manner.

The rod 220 is an elongate rod-shaped body as a whole. The rod 220 includes a body rod 221 and a tip rod 222. The body rod 221 is a spindle and has a male feed screw (not shown) on the outer surface of the base end thereof (at the lower side in the present exemplary embodiment). As described above, the female thread of the body cylinder part 211 and the feed screw of the body rod 221 are screwed with each other to form the feed mechanism.

The tip rod 222 is disposed inside the head cylinder part 212. The base end (here, the lower end face) of the tip rod 222 is in contact with the tip (here, the upper end face) of the body rod 221. The tip side (here, the upper side) of the tip rod 222 has a cone-shape.

The contact point 230 is provided in the head cylinder part 212 to move forward and backward in a direction perpendicular to (intersecting) the axial direction of the rod 220. Three contact points 230 are disposed at 120° intervals in the head cylinder part 212. Each contact point 230 has a thin round shaft tip 231 formed of cemented carbide at the outer end thereof. When each contact point 230 moves forward in the protruding direction, the round shaft tip 231 is brought into contact with the inner wall of an object to be measured.

The inner end side of each contact point 230 is formed with a tapered surface, and the tapered surface is brought into contact with the conical surface of the tip rod 222. The conical surface of the tip rod 222 and the tapered surface of each contact point 230 constitute a displacement direction conversion means for changing the direction of force and displacement to a right angle.

Inside the head cylinder part 212, a spring (for example, plate spring) 232 corresponding to each contact point 230 is provided. One end of each plate spring 232 is fixed to the inner wall of the head cylinder part 212, and the other end of each plate spring 232 is fixed to the corresponding contact point 230. Each plate spring 232 biases the corresponding contact points 230 in the direction of being retracted into the head cylinder part 212. When the rod 220 is moved (pulled down) toward the base end side (downward) by an external force, the force of the plate springs 232 causes the contact points 230 to follow the rod 220 and to move (backward) in the direction of entering the head cylinder part 212.

The part of the head cylinder part 212 at which the contact points 230 are projected and retracted (the tip end part of the inside-diameter measuring device) is also referred to as the measuring head part.

The thimble part 240 is provided at the base end (lower side in the present exemplary embodiment) of the body cylinder part 211. The thimble part 240 is fitted externally to the base end of the rod 220 (body rod 221) via a ratchet mechanism (not shown), and when the thimble part 240 is operated to rotate by an external force, the rod 220 (body rod 221) rotates together with the thimble part 240.

The ratchet mechanism (not shown) is provided between the thimble part 240 and the base end of the rod 220 (body rod 221). The direction of rotation of the thimble part 240 or the body rod 221 to move the body rod 221 upward (the direction to project the contact points 230) is the positive direction of rotation. On the other hand, the direction of rotation of the thimble part 240 or the body rod 221 to move the rod 220 downward (the direction to retract the contact points 230) is the negative direction of rotation. The ratchet mechanism allows the thimble part 240 to idle against the body rod 221 in the positive direction of rotation and does not allow the thimble part 240 to idle in the negative direction of rotation.

There is an upper limit to the force (rotational force in the positive direction) transmitted from the thimble part 240 to the body rod 221 via the ratchet mechanism. For example, the ratchet mechanism may be provided with a spring (load regulating elastic body) that regulates the upper limit of the (positive rotational) load applied from the thimble part 240 to the body rod 221. If the body rod 221 is forced to rotate (in the positive direction) beyond the upper limit of the load, the thimble part 240 idles against the body rod 221 due to the ratchet mechanism. This ratchet mechanism constitutes a constant pressure mechanism that regulates the upper limit of the force (measuring force) acting between an object to be measured and the contact points 230. Conversely, a predetermined force (measuring force) defined by the ratchet mechanism is generated between the workpiece (object to be measured) and the contact points 230, and when the contact points 230 apply the predetermined force (measuring force) to the workpiece, the reaction force is applied to the contact points 230, that is, the inside-diameter measuring unit 200.

The displacement detection part 250 is provided inside the body cylinder part 211 to detect displacement of the body rod 221. The displacement detection part 250 is, for example, a rotary encoder or a linear encoder, and its detection method is not particularly limited. Examples of the displacement detection part 250 include a photoelectric encoder, a capacitive encoder, an electromagnetic induction encoder, a magnetic encoder, and the like. The displacement (position) of the contact points 230 is calculated from the displacement (position) of the body rod 221 detected by the displacement detection part 250.

The electric drive unit 260 is a drive unit that rotates the thimble part 240. The electric drive unit 260 is provided under the thimble part 240. The electric drive unit 260 is, for example, a motor, and the rotational output of the motor is transmitted to the thimble part 240 via a power transmission mechanism (a gear train, a coupling belt, a coupling shaft, a coupling link, or the like) 261.

The guide cone 300 is a conical (cone-shaped) member provided on the tip end face of the head cylinder part 212.

Figure 5:
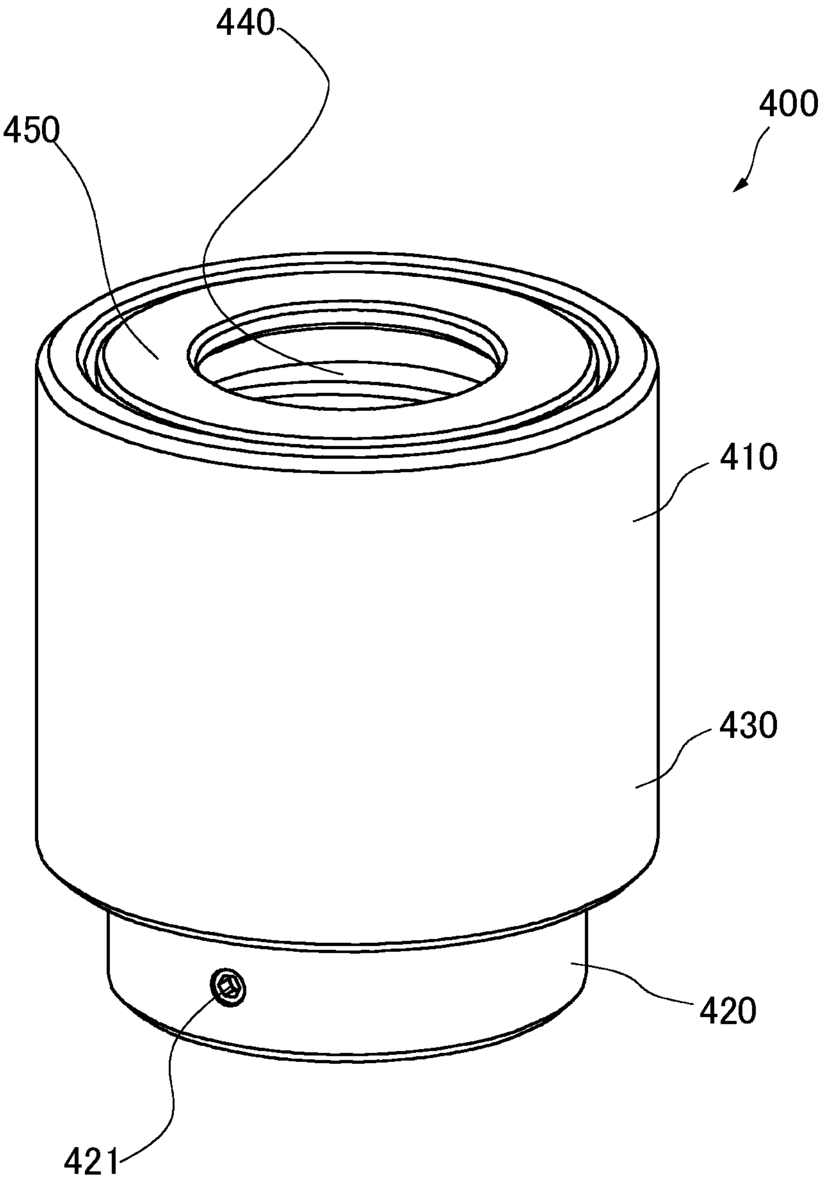
FIG. 5 is an external view of a workpiece stopper.

FIG. 5 is an external view of the workpiece stopper 400.

Figure 6:
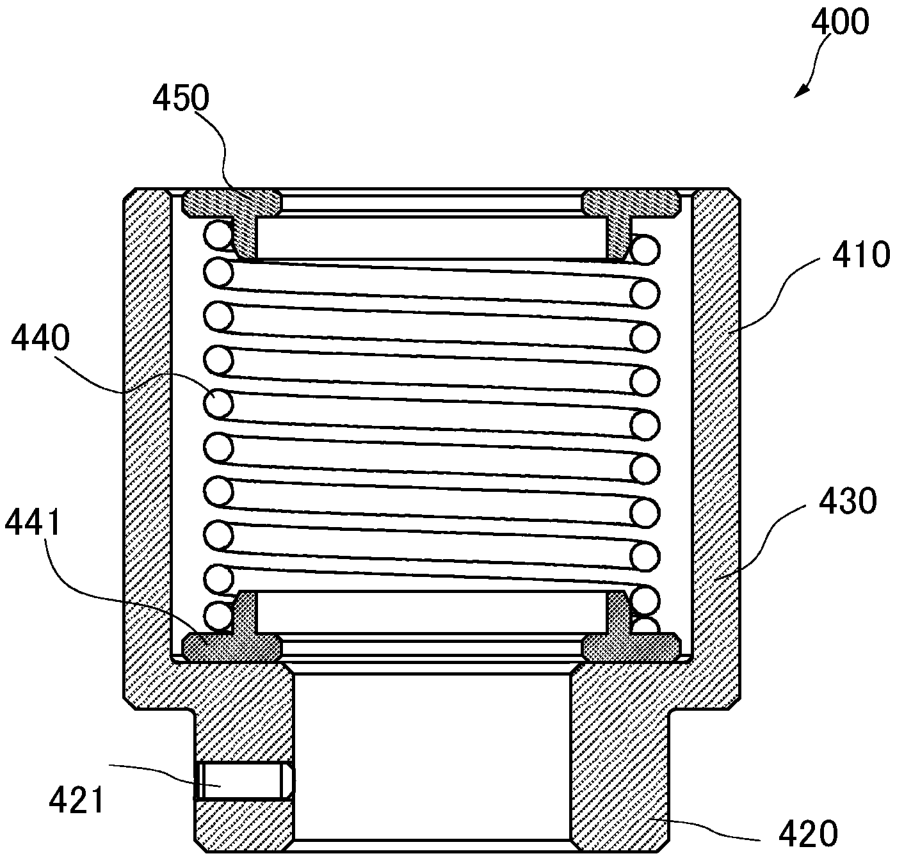
FIG. 6 is a cross-sectional view of the workpiece stopper.

FIG. 6 is a cross-sectional view of the workpiece stopper 400.

The workpiece stopper 400 includes a cylindrical housing part (housing part) 410, a spring (for example, coil spring) (elastic member) 440, and a support plate (support surface) 450.

The workpiece stopper 400 constitutes a support surface (placing surface) that supports the workpiece and allows at least one of posture change (posture adjustment) of the workpiece and position change of the workpiece. The workpiece stopper 400 is fixedly attached to the outside of the cylinder case part 210 at the tip side of the cylinder case part 210. The attaching position (attaching height) of the workpiece stopper 400 is the position (height) at which the upper end face (or support surface) of the workpiece stopper 400 is positioned at the base end (in this case, at the lower side) by a predetermined distance from the contact points 230 of the inside-diameter measuring unit 200. The distance between the contact points 230 and the workpiece stopper 400 in the axial direction (height direction) can define the measuring point of the workpiece (object to be measured). The attaching position (height) of the workpiece stopper 400 is adjusted according to a desired distance of the measuring point from the end face of the workpiece.

The cylindrical housing part 410 is a short cylindrical body with openings at both ends.

The cylindrical housing part 410 includes a slightly-small-diameter attaching cylinder part 420 that fits almost externally into the cylinder case part 210, and a slightly-large-diameter accommodating cylinder part 430 having a diameter expanded with a step from the attaching cylinder part 420. An attaching screw 421 is screwed in from the outer surface of the attaching cylinder part 420, and the workpiece stopper 400 is attached and secured to the cylinder case part 210.

The accommodating cylinder part 430 accommodates a coil spring 440 and a support plate 450.

The coil spring 440 is disposed inside the accommodating cylinder part 430 to surround the cylinder case part 210 of the inside-diameter measuring unit 200. The coil spring 440 has sufficient strength (a spring constant, a spring strength, and an elastic constant) to support the weight of the workpiece, while being compressed and deformed to some extent when measurement pressure is applied to the workpiece from the inside-diameter measuring unit 200. A ring-shaped spring holder 441 is disposed on the stepped surface between the attaching cylinder part 420 and the accommodating cylinder part 430 (on the inside end face of the accommodating cylinder part 430), and the base end side of the coil spring 440 is held. Then, the support plate 450 is disposed on the tip side of the coil spring 440 (on the upper end side of the coil spring 440).

The support plate 450 is a ring-shaped plate, and the end face (upper end face) thereof is the surface on which the workpiece is placed (support surface). When the workpiece stopper 400 is attached to the inside-diameter measuring unit 200, the support plate (support surface) 450 is a surface perpendicular to (intersecting) the axis of the cylinder case part 210, and the support plate (support surface) 450 looks like overhanging in a flange shape from the cylinder case part 210. Since the support plate 450 is supported by the coil spring 440, the support plate 450 can relatively change its inclination angle (posture) and position with respect to the cylinder case part 210 of the inside-diameter measuring unit 200. (The support surface (upper end face) of the support plate 450 is desirably machined to reduce friction to the extent that the workpiece can slide on the support surface without resistance and change its position.) The support plate 450 and the coil spring 440 constitute a workpiece posture/position change means for allowing posture change (posture adjustment) and/or position change of the workpiece.

The operation of the inside-diameter measuring unit 200 is basically the same as the operation of an existing manual inside-diameter measuring device, except that the rod is fed by the electric drive unit 260. When the rod 220 is moved forward and backward by electric power, the contact points 230 are projected from and retracted into the head cylinder part 212 in response to the movement of the tip rod 222. By detecting the displacement (position) of the rod 220 when the three contact points 230 are in even contact with the inner wall of the hole to be measured, the hole diameter of the hole to be measured is acquired as a measurement value.

(Outside-Diameter Measuring Unit)

The outside-diameter measuring unit 500 is also disclosed by the present applicant as an automated micrometer in, for example, JP 2021-188986 A (JP 7097925 B).

Figure 7:
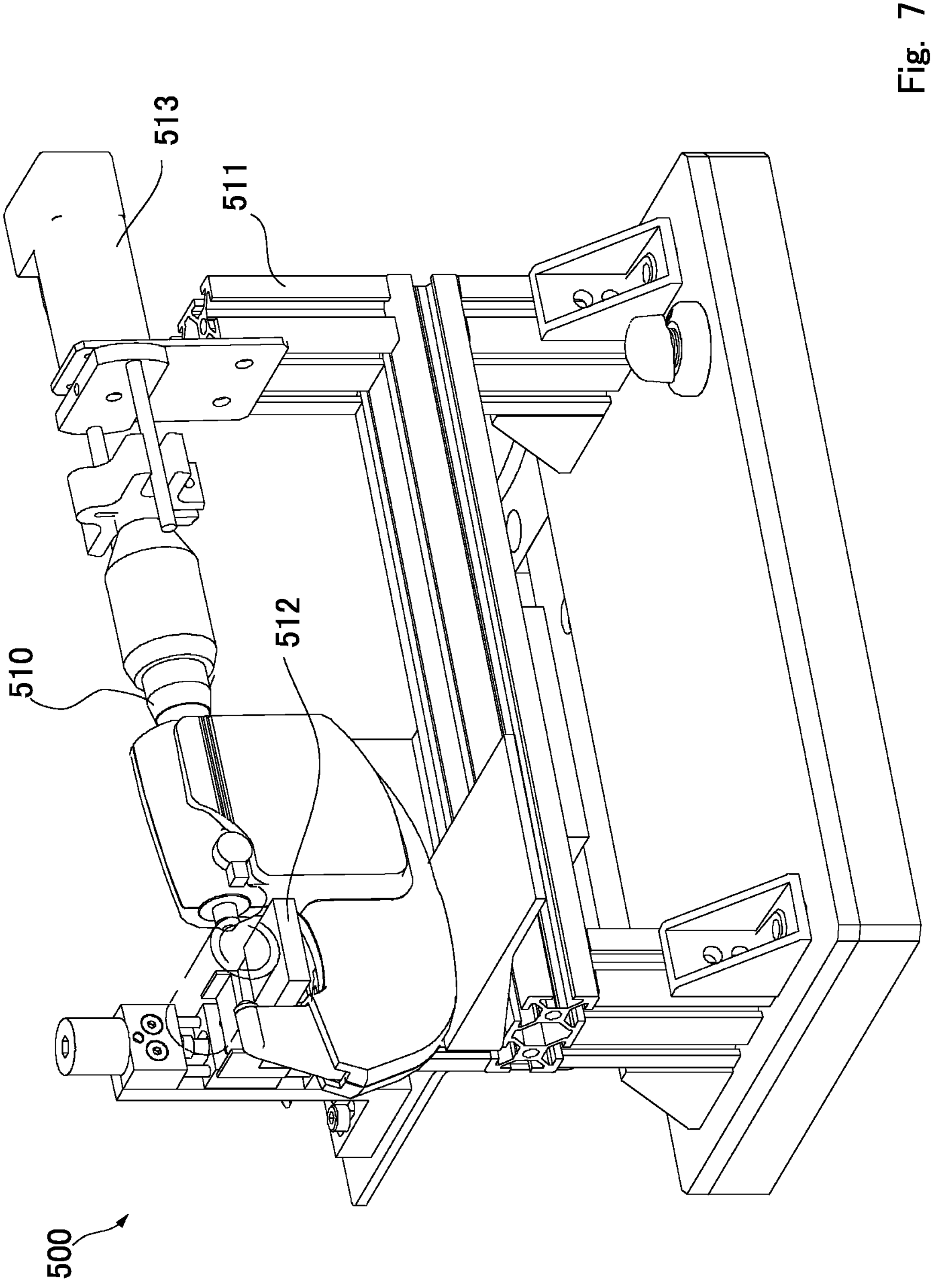
FIG. 7 is an enlarged view of an outside-diameter measuring unit.

FIG. 7 is an enlarged view of the outside-diameter measuring unit 500.

The outside-diameter measuring unit 500 includes a support base part 511 that supports an outside-diameter measuring device (automatic micrometer apparatus) 510, a workpiece holding base part 512 that holds a workpiece W within the measuring area of the outside-diameter measuring device 510, and an automatic operation unit 513 that automates forward/backward movement of a movable element (spindle) of the outside-diameter measuring device 510 by motor power.

When a workpiece is placed on the workpiece holding base part 512 by the robot arm part 600, the motor of the automatic operation unit 513 moves the spindle forward and sandwiches the workpiece between the anvil and the spindle (contact points). At this time, the workpiece holding base part 512 allows posture change (for example, rotational movement) and positional slide adjustment of the workpiece in order for the workpiece and the spindle (anvil) to be in close contact.

When the spindle (contact points) is properly in contact (close contact) with the outer surface of the workpiece with a predetermined measurement pressure, the encoder (displacement detection part) detects the displacement (position) of the spindle to acquire the measurement value of the outside diameter of the workpiece. (If the displacement detection parts need to be distinguished, the displacement detection part 250 of the inside-diameter measuring unit 200 may be referred to as a first displacement detection part 250 and the displacement detection part of the outside-diameter measuring unit 500 may be referred to as a second displacement detection part.) An example of controlling the forward/backward movement of the spindle while allowing posture change and/or position change of the workpiece in order for the workpiece and the spindle are in close contact with each other with the predetermined measurement pressure in the automatic outside-diameter measuring device (automatic micrometer apparatus) 510 is also disclosed in JP 2021-188986 A (JP 7097925 B), and controlling the forward/backward movement of the contact points 230 (or the rod 220) in the inside-diameter measuring unit 200 is described below.

In addition to a micrometer, a caliper, a digital dial gauge (test indicator), or other measuring devices (measuring parts) may be employed as an outside (outside-diameter) measuring device.

The robot arm part 600 is what is called a multi-joint robot arm and includes a robot hand part 610 that grasps the workpiece at its tip.

Figure 8:
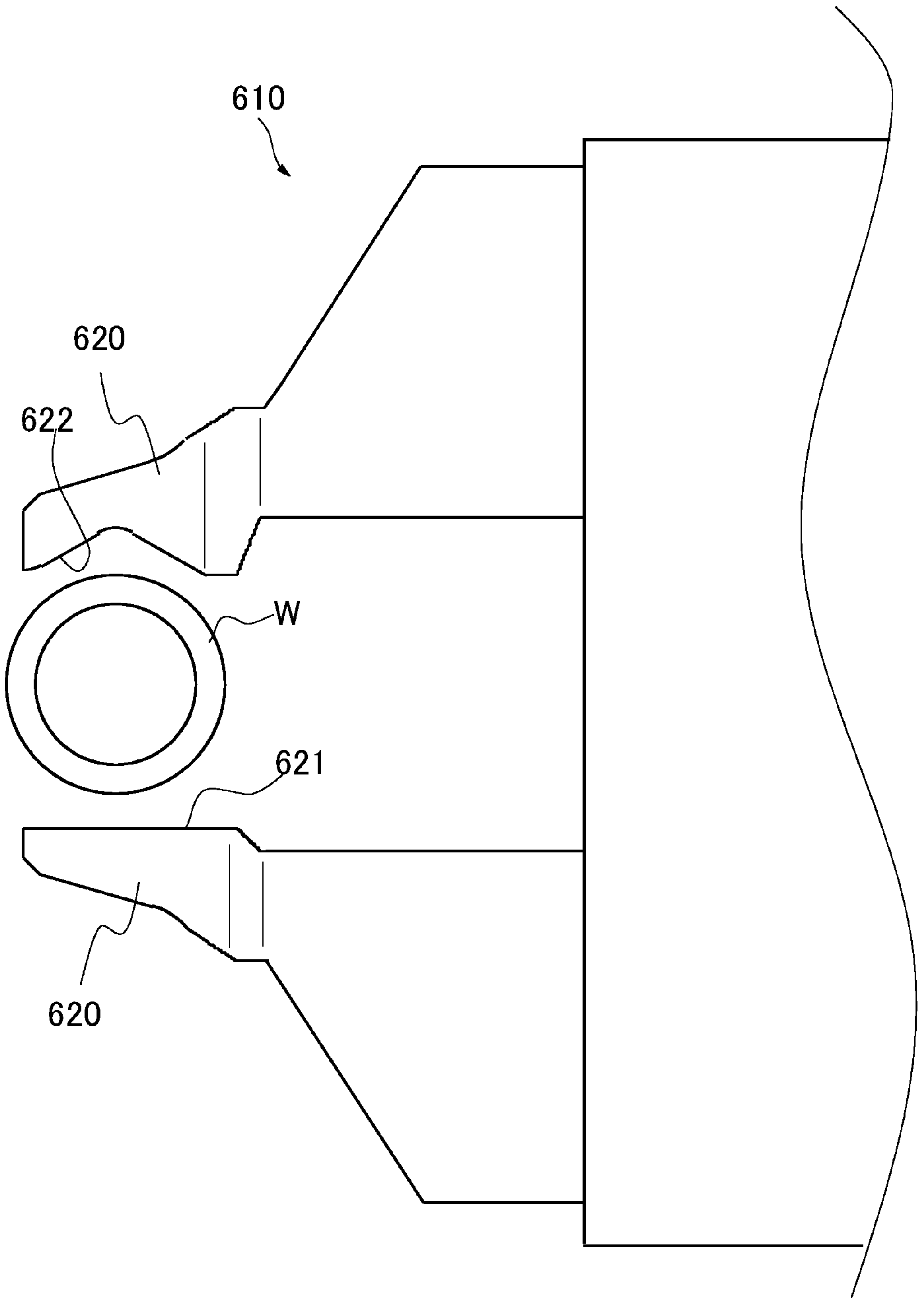
FIG. 8 is an enlarged plan view of a robot hand part.

FIG. 8 is an enlarged plan view of the robot hand part 610.

The robot hand part 610 includes two claws 620 that move in a direction to be brought into contact with or away from each other. In order to grasp the cylindrical workpiece, one claw 620 has a flat surface 621 and the other claw 620 has a V-groove 622.

(Control Unit 700)

Figure 9:
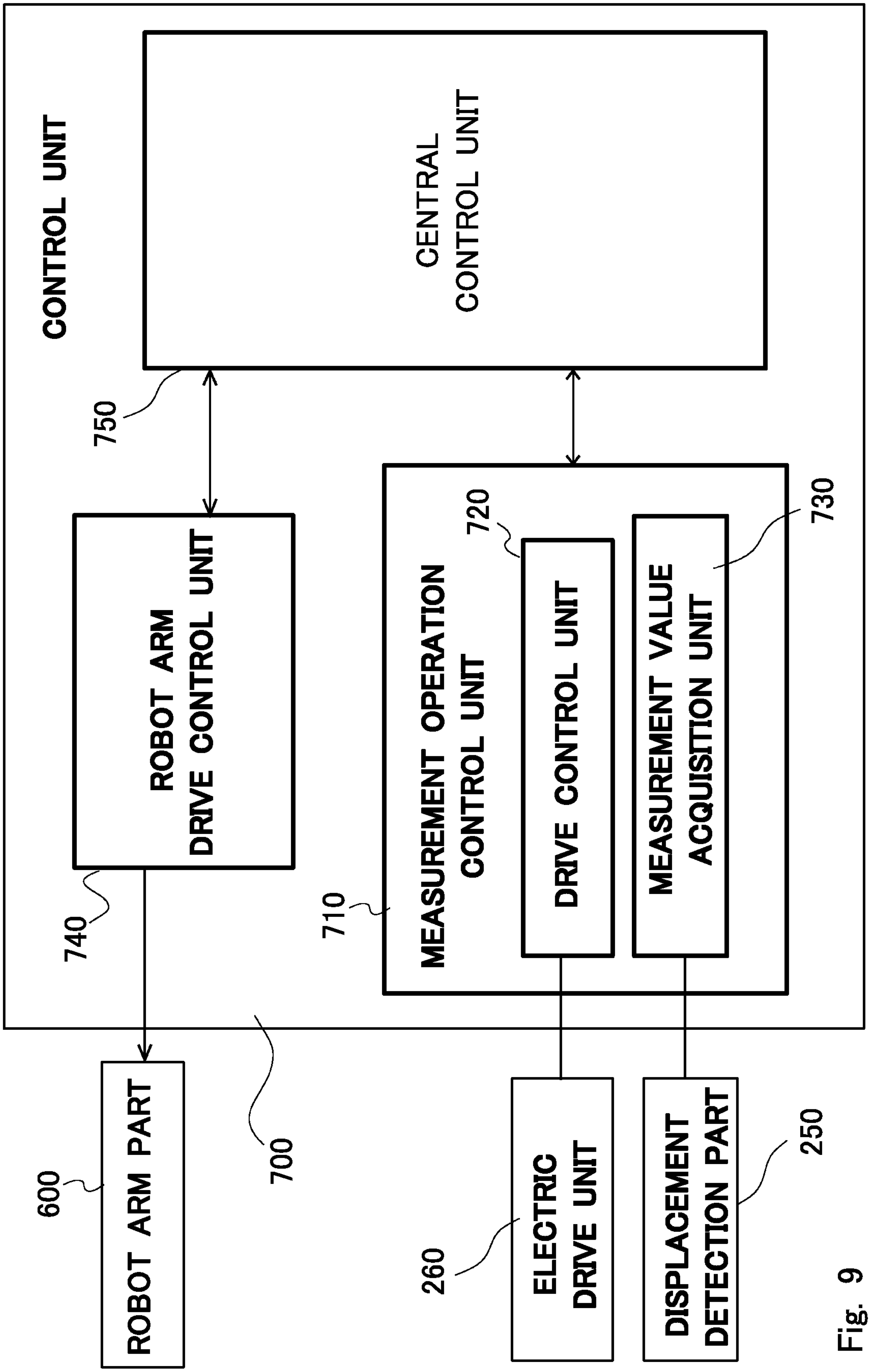
FIG. 9 is a functional block diagram of a control unit.

FIG. 9 is a functional block diagram of the control unit 700.

The control unit 700 is implemented by hardware or software incorporated into a computer (a computer terminal including a central processing unit (CPU) and a ROM or a RAM storing predetermined programs) that is connected to the measuring-apparatus main body 110 by wired or wireless communication. An operation control program (measuring part program) is installed in the computer terminal, and the measurement operation of the measuring-apparatus main body 110 is controlled by executing the program. The method of supplying the program is not limited. The program may be installed by inserting a (nonvolatile) recording medium recording the program directly into the computer, or a reading device that reads the information on the recording medium may be attached externally to the computer to install the program into the computer from the reading device. Alternatively, the program may be supplied to the computer via a communication line, such as the Internet, a LAN cable, or a telephone line, or wirelessly.

The control unit 700 includes a measurement operation control unit 710, a robot arm drive control unit 740, and a central control unit 750.

The measurement operation control unit 710 controls the measurement operation of the electric inside-diameter measuring unit 200. The measurement operation control unit 710 includes a drive control unit 720 and a measurement value acquisition unit 730.

The drive control unit 720 controls the drive of the electric drive unit 260 and controls the forward/backward movement of the rod 220, that is, the contact points 230. The measurement value acquisition unit 730 acquires a measurement value of the inside-diameter measuring unit 200. That is, the measurement value acquisition unit 730 receives a detection value of the displacement detection part 250 to acquire the measurement value of the inside diameter of the hole to be measured from the displacement (position) of the rod 220.

The robot arm drive control unit 740 controls the operation of the robot arm part 600. The central control unit 750 integrally controls the measurement operation control unit 710 and the robot arm drive control unit 740.

(Inside-Diameter Measurement Operation)

The operation of measuring the inside diameter of the workpiece with the inside-diameter measuring unit 200 is described below.

Figure 10:
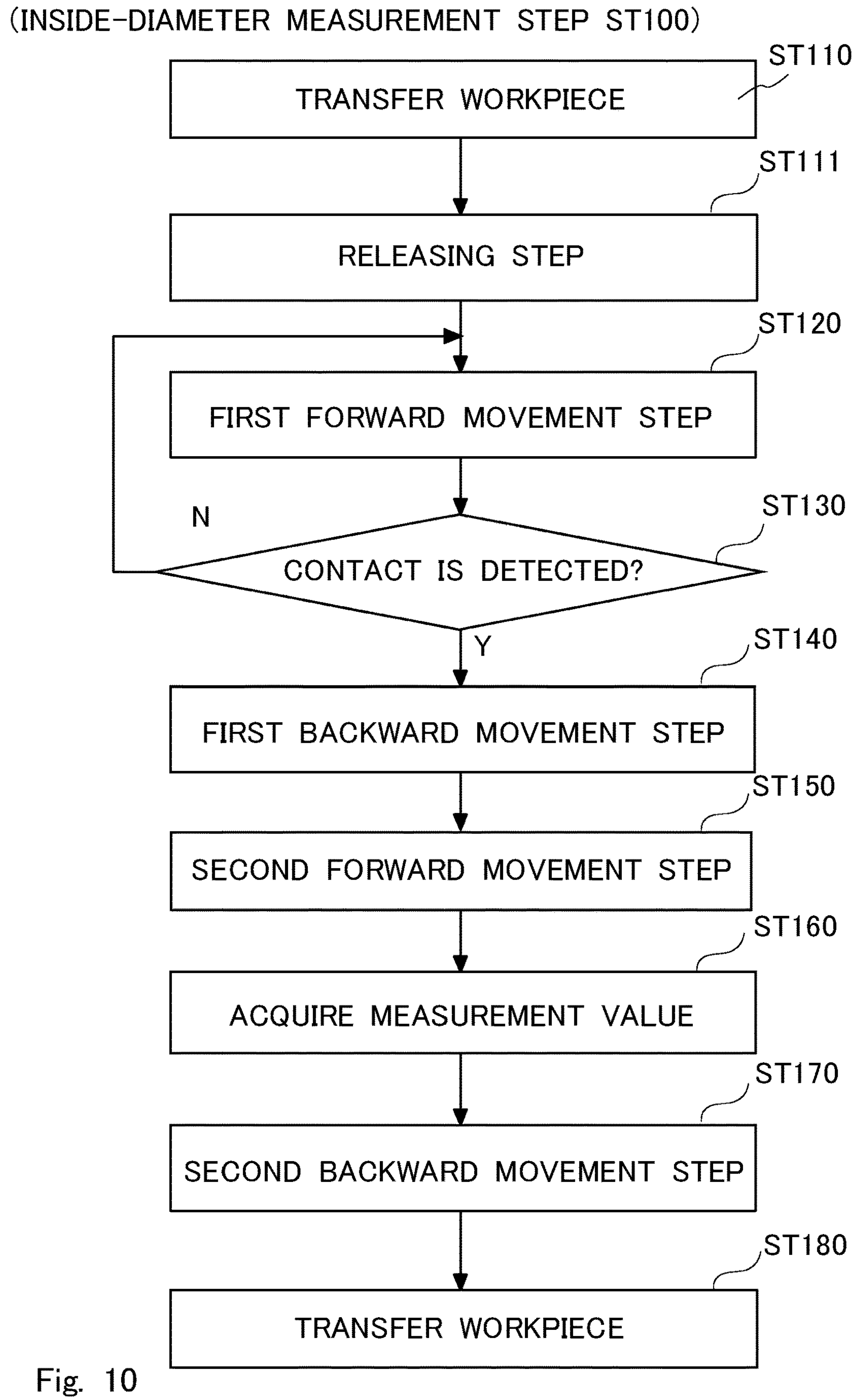
FIG. 10 is a flowchart showing an operational procedure of an inside-diameter measurement step.

FIG. 10 is a flowchart showing an operational procedure of an inside-diameter measurement step (ST100).

Figure 11:
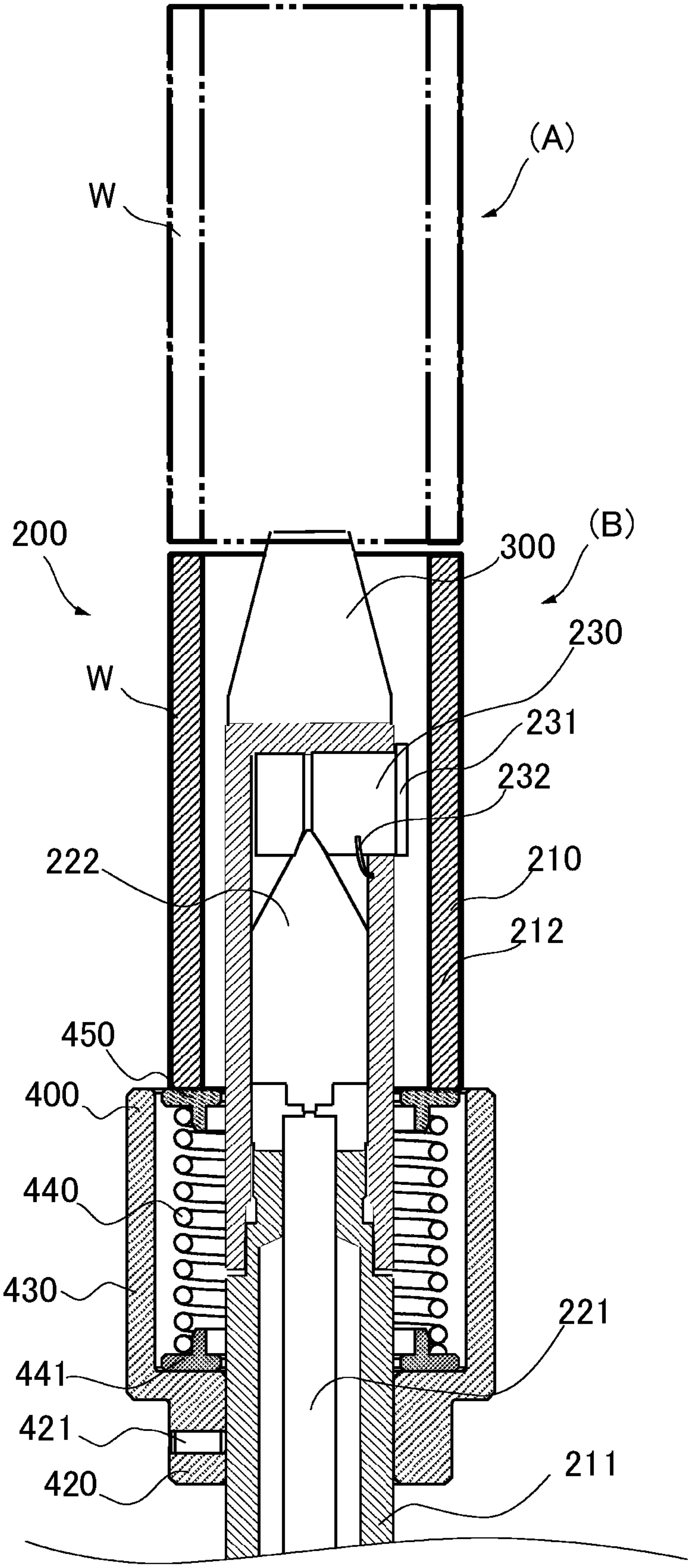
FIG. 11 is a view showing that the inside-diameter measuring unit is being inserted in a hole in a workpiece.

In the inside-diameter measurement step (ST100), the workpiece is transferred first (ST110). Specifically, the robot hand part 610 of the robot arm part 600 grasps and lifts the workpiece and moves the workpiece directly above the inside-diameter measuring unit 200 (ST110). The position of the robot hand part 610 when grasping and moving the workpiece with the robot hand part 610 may be controlled by, for example, image recognition or laser ranging with a camera or by pre-programming the coordinates of the locus of the movement. As shown in (A) in FIG. 11, when the hole in the workpiece is brought slightly over the tip of the guide cone 300, in other words, when the upper end (tip) of the guide cone 300 is slightly in the hole in the workpiece, the robot hand part 610 releases the workpiece (a releasing step ST111). Then, the workpiece falls downward by gravity and is caught by the support plate 450 of the workpiece stopper 400, as illustrated in (B) in FIG. 11. Now, the measuring head part (head cylinder part 212) of the inside-diameter measuring unit 200 is in the hole (hole to be measured) in the workpiece.

The gap between the hole in the workpiece and the measuring head part is only a few millimeters, and it is somewhat difficult to completely insert the measuring head part into the hole in the workpiece under the control of the robot arm part 600. In this respect, the guide cone 300 is provided in the present exemplary embodiment. Therefore, once the tip of the guide cone 300 is in the hole in the workpiece, the measuring head part is then guided by the inclination of the guide cone 300 to the hole in the workpiece. This allows for slightly coarser control accuracy of the robot arm part 600. In the present exemplary embodiment, the inside-diameter measuring unit 200 is installed with the measuring head part facing upward. Therefore, when the robot hand part 610 releases the workpiece once the upper end (tip) of the guide cone 300 is slightly in the hole in the workpiece, the workpiece moves downward by gravity and is placed on the workpiece stopper 400.

If the robot arm part 600 (robot hand part 610) moves the workpiece while grasping the workpiece to insert the inside-diameter measuring unit 200 into the hole in the workpiece, the workpiece and the inside-diameter measuring unit 200 can come into contact or collide with each other while the workpiece is grasped by the robot arm part 600 (robot hand part 610).

If the workpiece comes into contact with the inside-diameter measuring unit 200 while the workpiece is grasped by the robot arm part 600 (robot hand part 610), the force applied to both is large. This can cause accidents such as damage to the workpiece or the inside-diameter measuring unit 200. In this regard, the workpiece is released slightly above the inside-diameter measuring unit 200 in the present exemplary embodiment, instead of inserting the inside-diameter measuring unit 200 completely into the hole in the workpiece under the control of the robot arm part 600. Thus, accidents such as collision between the workpiece and the inside-diameter measuring unit 200 with large force are unlikely to occur.

Now, when the workpiece is placed on the support plate 450, the workpiece is supported by the coil spring 440 via the support plate 450. At this time, the coil spring 440 is slightly compressed and deformed by the weight of the workpiece, and the support plate 450 slightly sinks due to the compression of the coil spring 440. In addition, when the workpiece is placed on the support plate 450, the central axis of the workpiece and the central axis of the support plate 450 can be misaligned. Furthermore, the end face of the workpiece is not always perfectly perpendicular to the central axis of the workpiece. If the end face of the workpiece is not perpendicular to the central axis of the workpiece, the workpiece can be inclined to either side.

In this state, the drive control unit 720 of the control unit 700 transmits a drive signal to drive the electric drive unit 260 to bring the contact points 230 into contact with the inner wall of the workpiece.

First, a first forward movement step (ST120) is performed. The first forward movement step (ST120) is a step of moving the contact points 230 forward until the contact points 230 are brought into first contact with the inner wall of the hole to be measured. The electric drive unit 260 (for example, a motor) is driven to move the rod 220 forward (in this case, upward) to move the contact points 230 forward toward the inner wall of the hole. In the first forward movement step (ST120), the motor is driven at high speed to move the rod 220 and the contact points 230 as fast as possible to improve measurement efficiency. (For example, if the rod 220 is a screw feed, the rotational speed of the rod 220 is 100 rpm to 200 rpm. In terms of the speed at which the rod 220 or the contact points 230 move, the speed may be 1 mm/s to 2 mm/s.)

As the contact points 230 move forward toward the inner wall of the hole, the contact points 230 are brought into contact with the inner wall of the hole. Here, in the present exemplary embodiment, the number of the contact points 230 is three. If the axis of the inside-diameter measuring unit 200 and the axis of the hole to be measured are perfectly aligned, the three contact points 230 can be brought into contact with the inner wall of the hole at the same time, but the workpiece can be slightly inclined on the support plate 450 as described above. In such a state, the three contact points 230 are sequentially brought into contact with the inner wall of the hole. When it is detected that the contact points 230 have been brought into contact with the inner wall of the hole (ST130: YES), the first forward movement step (ST120) is stopped, and the procedure proceeds to a first backward movement step (ST140). To determine that the contact points 230 have been brought into contact with the inner wall of the hole, by, for example, calculating the motor torque from the applied current (applied voltage) of the motor, when the torque exceeds a predetermined value, it may be determined that the contact points 230 have been brought into contact with the inner wall of the hole. Alternatively, by monitoring a detection value of the displacement detection part 250, when the detection value increases although the drive signal is transmitted, it may be determined that the contact points 230 have been brought into contact with the inner wall of the hole.

In the first backward movement step (ST140), the rod 220 and the contact points 230 are moved backward slightly in the opposite direction. This avoids the contact points 230 from digging into the inner wall of the hole due to its momentum after the contact points 230 have been brought into contact with the inner wall of the hole in the first forward movement step (ST120).

The distance for moving the contact points 230 backward in the first backward movement step (ST140) is very small, for example, 0.01 mm to 0.02 mm.

The speed of backward movement of the contact points 230 in the first backward movement step (ST140) may be as fast as possible. For example, if the rod 220 is a screw feed, the rotational speed of the rod 220 is 100 rpm to 200 rpm. In terms of the speed at which the rod 220 or the contact points 230 move, the speed may be 1 mm/s to 2 mm/s.

After the contact points 230 are moved backward slightly in the first backward movement step (ST140), the contact points 230 are moved forward again in a second forward movement step (ST150). In the second forward movement step (ST150), the contact points 230 are moved forward slowly (at a low speed with fine movement).

The feed speed of the contact points 230 in the second forward movement step (ST150) is preferably slow (micro-motion). For example, if the rod 220 is a screw feed, the rotational speed of the rod 220 is 10 rpm to 20 rpm. In terms of the speed at which the rod 220 or the contact points 230 move, the speed may be 0.1 mm/s to 0.2 mm/s.

Figure 12:
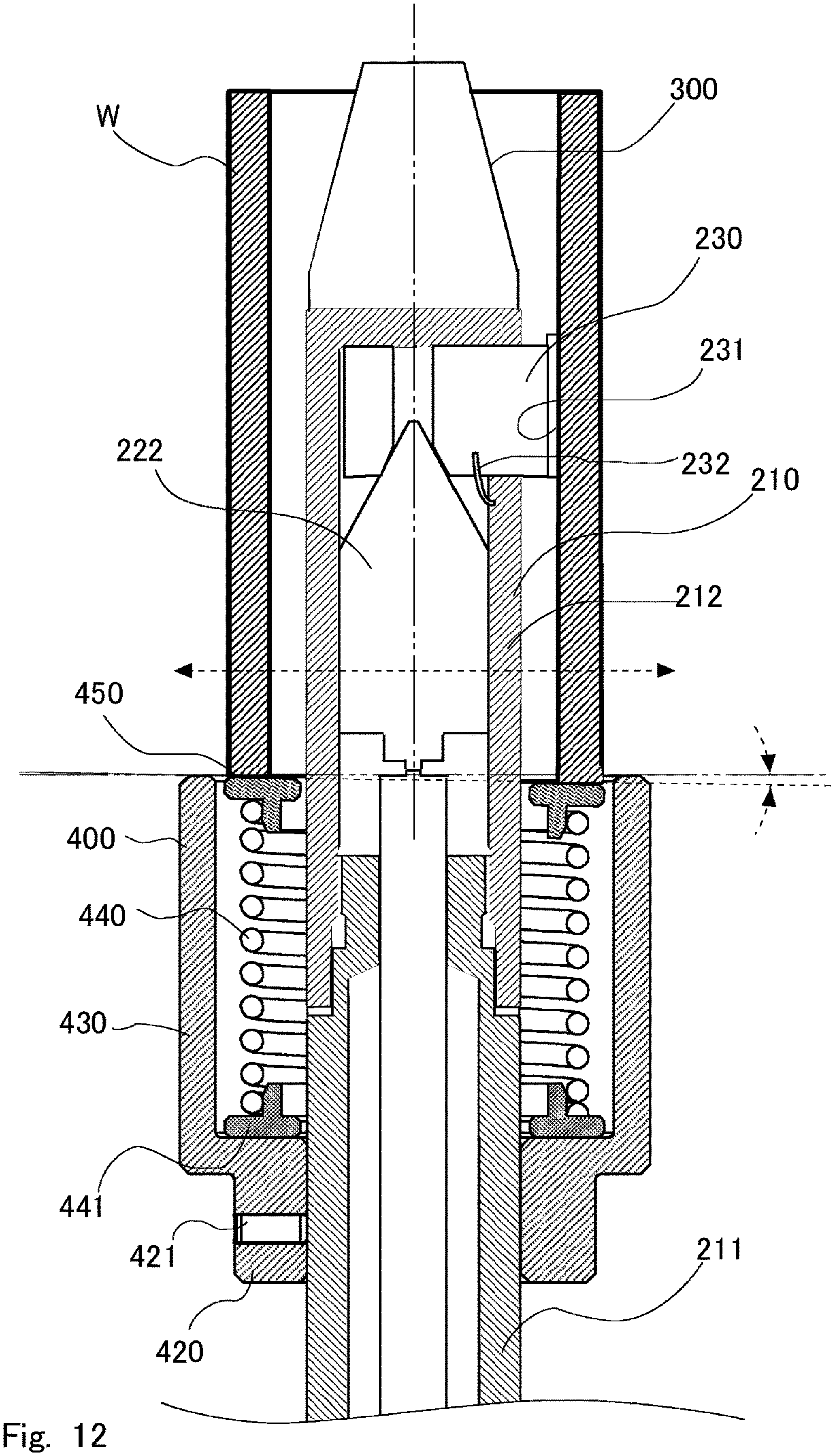
FIG. 12 is a view showing an example of a workpiece whose posture is automatically adjusted.

The position and inclination of the workpiece are automatically (autonomously) adjusted by the force of the contact points 230 pushing against the inner wall of the hole. At this time, the support plate 450 is supported by the coil spring 440, and the position and inclination of the support plate 450 are also automatically (autonomously) adjusted following the changes in position and posture of the workpiece. Thus, the central axis of the workpiece and the axis of the inside-diameter measuring unit 200 are aligned, as illustrated in FIG. 12. Then, the automatic (autonomous) adjustment of the position and inclination of the workpiece is completed when the three contact points 230 are in even contact with the inner wall of the hole with the predetermined measurement pressure. When the three contact points 230 are in contact with the inner wall of the hole with the predetermined measurement pressure, the ratchet mechanism (constant pressure mechanism) is activated. That is, the electric drive unit 260 rotates and drives the thimble part 240 until the ratchet mechanism (constant pressure mechanism) is activated, which causes the contact points 230 to be in even contact with the inner wall of the hole with the predetermined measurement pressure.

The second forward movement step (ST150) can be rephrased as automatic (autonomous) adjustment step.

In this state, the displacement detection part 250 detects the displacement (position) of the rod 220. The measurement value acquisition unit 730 acquires the measurement value of the inside diameter of the hole from the displacement (position) of the rod 220 (ST160).

After the measurement value is acquired, the contact points 230 are moved backward in a second backward movement step (ST170) to separate the contact points 230 from the inner wall of the hole. Now, the measurement value of the inside diameter of one hole is acquired.

The robot hand part 610 grasps and lifts the workpiece and moves the workpiece (transfer workpiece ST180). This completes the inside-diameter measurement of one workpiece. At this time, the position and inclination of the workpiece are automatically (autonomously) adjusted by the force of the contact points 230 pushing evenly against the inner wall of the hole, and the central axis of the workpiece and the central axis of the inside-diameter measuring unit 200 (cylinder case part 210) are aligned, that is, the gap between the inner circumference of the workpiece and the inside-diameter measuring unit 200 (cylinder case part 210) is secured. Therefore, by grasping the workpiece with the robot hand part 610 and lifting the workpiece straight upward, the workpiece can be removed from the inside-diameter measuring unit 200 (cylinder case part 210) without any collision between the inner surface of the workpiece and the inside-diameter measuring unit 200 (cylinder case part 210).

After this, when the outside diameter of the workpiece is to be measured, the robot arm part 600 moves the workpiece to the workpiece holding base part 512 of the outside-diameter measuring unit 500 to perform the outside diameter measurement.

The procedure returns to ST110 and repeats ST110 to ST180 until the measurement of the holes to be measured of all workpieces is completed.

As described above, according to the present exemplary embodiment, it is possible for the electric inside-diameter measuring unit 200 (the electric inside-diameter measuring device 200 and the robot arm part 600) to automatically measure the inside diameter of a hole, without the need for a human hand to hold and operate an inside-diameter measuring device.

First Modification

Figure 13:
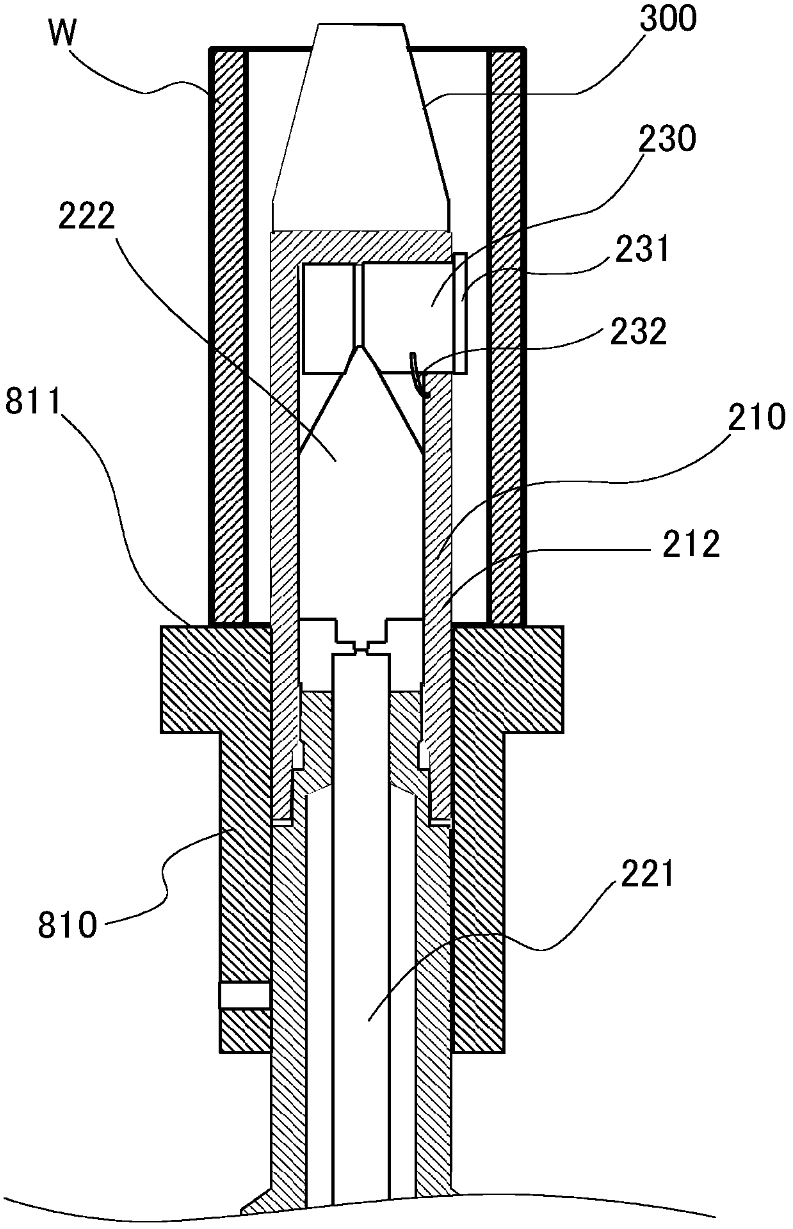
FIG. 13 is a view showing a modification of the workpiece stopper.

In the above embodiment, the coil spring 440 supports, as the workpiece stopper 400, the support plate 450, and the support plate 450 follows changes in posture (inclination) and position of the workpiece to support the workpiece. As a first modification, when, for example, the end face of the workpiece is perpendicular to the central axis of the workpiece and no inclination adjustment of the workpiece is necessary, as illustrated in FIG. 13, the coil spring (elastic body) 440 and support plate 450 may be omitted and a cylindrical workpiece stopper 810 having a flat support surface 811 at the tip side (upper end side) may be employed. In this case, the support surface 811 is desirably smooth enough to allow the workpiece to slide and change position on the support surface.

In addition, the support surface 811 of the workpiece stopper 810 may be provided with a thick layer of soft resin as an elastic member to allow the workpiece to change posture and/or position due to deformation of the resin.

Second Modification

The shape of the guide cone 300 is not limited to conical, but can be any cone shape with a inclined surface. Alternatively, the guide member is not necessarily a cone (cone-shape) and may be a pin (a thin rod-shaped body (shaft)) as long as the shape has a portion with a diameter smaller than the diameter of the head cylinder part 212.

Third Modification

The outside-diameter measuring unit 500 may be installed closer to the inside-diameter measuring unit 200, and the workpiece stopper 400 of the inside-diameter measuring unit 200 also serves as a workpiece holding base of the outside-diameter measuring unit 500. After the inside diameter measurement operation of the inside-diameter measuring unit 200, the outside diameter measurement operation of the outside-diameter measuring unit 500 may be continued without moving the workpiece. The order may be reversed so that after the outside diameter measurement operation of the outside-diameter measuring unit 500, the inside diameter measurement operation of the inside-diameter measuring unit 200 may be continued without moving the workpiece. Alternatively, the inside diameter measurement and outside diameter measurement may be performed simultaneously (almost simultaneously) on the workpiece on the workpiece stopper 400. FIGS. 1 and 7 show that the micrometer frame of the outside-diameter measuring unit stands vertically and the cylindrical workpiece is measured in a horizontal position, but the installation posture of the micrometer is changed and the micrometer frame is laid horizontally to measure the workpiece with the central axis in a vertical position.

The present invention is not limited to the above exemplary embodiment, and can be appropriately modified without departing from the gist.

When the rod 220 is to be driven, in addition to screw feeding by rotation, a linear motion may be used to raise and lower the rod 220.

In the above exemplary embodiment, the multi-joint robot arm part 600 is described as an example of a moving means, but the moving means does not need to be a large-scale device, but may be a one or two dimensional driving apparatus. For example, the one or two dimensional driving apparatus includes a column, a slider that slides along the column, a motor that drives the slider, and a power transmission mechanism (a ball screw, a belt pulley, or the like) that couples the motor and the slider.

In the above embodiment, the inside-diameter measuring unit 200 is installed facing upward, but the orientation (posture) of the inside-diameter measuring unit 200 is not limited. For example, the inside-diameter measuring unit 200 may be installed facing sideward or downward.

In the above exemplary embodiment, what is called a hole test (Borematic (registered trademark)) is described as an example of the structure of the inside-diameter measuring part, but any inside-diameter measuring device with the contact points 230 that move forward and backward in conjunction with the rod 220 to be brought into contact with the inside wall is applicable. For example, in the case of the head of a cylinder gauge, the head includes one contact point that moves forward and backward, an anvil that is coaxially opposed to the contact point for centering, and guide heads on both sides in the perpendicular direction.

In the present application, the inside diameter in inside-diameter measurement should be interpreted to mean not only the inside diameter of a circular hole, but also the inside dimension of a workpiece in a broader sense. For example, the distance (inside dimension) between two surfaces (or two points) facing each other in a workpiece is referred to as the inside diameter of the workpiece. Similarly, the outside diameter in outside-diameter measurement should be interpreted to mean not only the outside diameter of a circular workpiece, but also the outside dimension of the workpiece.

100 Automatic measuring apparatus
110 Measuring-apparatus main body
120 Support column
130 Measuring unit
200 Inside-diameter measuring unit
210 Cylinder case part
211 Body cylinder part
212 Head cylinder part
220 Rod
221 Body rod
222 Tip rod
230 Contact point
240 Thimble part
250 Displacement detection part
260 Electric drive unit
261 Power transmission mechanism
300 Guide cone
400 Workpiece stopper
410 Cylindrical housing part
420 Attaching cylinder part
421 Attaching screw
430 Accommodating cylinder part
440 Coil spring
450 Support plate
500 Outside-diameter measuring unit
510 Outside-diameter measuring device
511 Support base part
512 Workpiece holding base part
513 Automatic operation unit
600 Robot arm part
610 Robot hand part
620 Claw
621 Flat surface
622 V-groove
700 Control unit
710 Measurement operation control unit
720 Drive control unit
730 Measurement value acquisition unit
740 Robot arm drive control unit
750 Central control unit
810 Workpiece stopper
811 Support surface

The invention claimed is:

1. An automatic inside-diameter measuring apparatus comprising:
an inside-diameter measuring part;
a moving means for relatively moving a workpiece having a hole to be measured with respect to the inside-diameter measuring part to insert and retract the inside-diameter measuring part into and from the hole to be measured; and
a control unit configured to control operation of the inside-diameter measuring part and the moving means, wherein
the inside-diameter measuring part includes:
a contact point configured to move forward and backward in a direction intersecting a cylinder axis of a cylinder case part at a tip side of the cylinder case part;
an electric drive unit configured to move the contact point forward and backward; and
a displacement detection part configured to detect displacement of the contact point.

2. The automatic inside-diameter measuring apparatus according to claim 1, wherein the inside-diameter measuring part is installed with the tip side facing upward.

3. The automatic inside-diameter measuring apparatus according to claim 1, wherein a workpiece stopper having a support surface supporting the workpiece is provided outside the cylinder case part and closer to a base end side from a position at which the contact point is provided.

4. The automatic inside-diameter measuring apparatus according to claim 3, wherein the support surface of the workpiece stopper is an elastic member or is supported by an elastic member.

5. The automatic inside-diameter measuring apparatus according to claim 3, wherein the workpiece stopper is configured to follow a change in posture or position of the workpiece to allow an inclination or a position of the support surface to change.

6. The automatic inside-diameter measuring apparatus according to claim 3, wherein
the workpiece stopper includes:
a cylinder housing part fixed to an outside of the inside-diameter measuring part; and
a spring provided inside the housing part to surround the outside of the inside-diameter measuring part, and
the support surface is supported by the spring.

7. The automatic inside-diameter measuring apparatus according to claim 1, wherein a guide member having a diameter smaller than a diameter of a tip end face of the cylinder case part is provided on the tip end face of the cylinder case part.

8. The automatic inside-diameter measuring apparatus according to claim 7, wherein the guide member is conical.

9. An automatic measuring apparatus comprising:
the automatic inside-diameter measuring apparatus according to claim 1; and
an outside-diameter measuring part configured to measure an outside dimension of the workpiece, wherein
the outside-diameter measuring part includes:
a movable element provided to be displaceable with respect to a fixed element and configured to move forward and backward to be brought into contact with or away from an outer surface of the workpiece;
a displacement detection part configured to detect displacement of the movable element; and
an automatic operation unit configured to automate the forward and backward movement of the movable element by power.

10. An inside-diameter measuring apparatus comprising:
an inside-diameter measuring part including a contact point configured to move forward and backward in a direction intersecting a cylinder axis of a cylinder case part at a tip side of the cylinder case part, and a displacement detection part configured to detect displacement of the contact point; and
a workpiece stopper provided outside the cylinder case part and closer to a base end side from a position at which the contact point is provided, wherein the workpiece stopper has a support surface supporting a workpiece outside the cylinder case part, the support surface of the workpiece stopper is an elastic member or is supported by an elastic member, and the workpiece stopper is configured to follow a change in posture or position of the workpiece to allow an inclination or a position of the support surface to change.

11. The inside-diameter measuring apparatus according to claim 10, wherein a guide member having a diameter smaller than a diameter of a tip end face of the cylinder case part is provided on the tip end face of the cylinder case part.

12. A control method for an automatic inside-diameter measuring apparatus, the automatic inside-diameter measuring apparatus including:

an inside-diameter measuring part including a contact point configured to move forward and backward in a direction intersecting a cylinder axis of a cylinder case part at a tip side of the cylinder case part, an electric drive unit configured to move the contact point forward and backward, and a displacement detection part configured to detect displacement of the contact point;

a moving means for relatively moving a workpiece having a hole to be measured with respect to the inside-diameter measuring part to insert and retract the inside-diameter measuring part into and from the hole to be measured; and a control unit configured to control operation of the inside-diameter measuring part and the moving means, the control method comprising:

drive-controlling, by the control unit, the moving means to release the workpiece above the cylinder case part in such a manner that a guide member, the guide member having a diameter smaller than a diameter of a tip end face of the cylinder case part and being provided on the tip end face of the cylinder case part, is inserted into the hole in the workpiece; and causing, by the control unit, the inside-diameter measuring part to measure the workpiece supported by a workpiece stopper, the workpiece stopper having a support surface supporting the workpiece and being provided outside the cylinder case part and closer to a base end side from a position at which the contact point is provided, wherein the inside-diameter measuring part is installed with the tip side facing upward.

* * * * *